Patented Mar. 26, 1940

2,194,894

UNITED STATES PATENT OFFICE 2,194,894

RESINIFIED SOYA BEAN OIL PRODUCT AND PROCESS OF MAKING SAME

Carleton Ellis, Montclair, N. J., assignor to Ellis-Foster Company, a corporation of New Jersey No Drawing. Application February 20, 1936, Serial No. 64,940

5 Claims. (Cl. 260—22)

This invention relates to resinous products and process of making same derived from a semi-drying oil such as soya bean oil, said products being designed for use as or in surface coatings and other compositions wherein the resin can be changed under appropriate conditions to an insoluble and infusible form.

This application is a continuation in part based on Serial 61,839, filed October 10, 1925, Patent No. 2,072,068, wherein are described and claimed resinous compositions derived from glyceride oils and/or their acids, crystalline polybasic acids and polyhydric alcohols.

Soya bean oil is generally classed as a semi-drying oil. Other oils of this class include corn, poppyseed, beechnut, sesame, croton, safflower, cottonseed and pumpkin seed. These oils are characterized by a relatively high content of oleic and other acids less saturated than oleic in the mixed acids, which causes them to dry at a slower rate than drying oils.

An object of the present invention is to prepare oxidizing alkyd resins from soya bean oil and the like. Another object is to prepare soya bean oil resins of improved drying capacity and which dry at a faster rate than soya bean oil resins containing phthalic acid as the polybasic acid constituent. Other objects will appear hereinafter.

Resins containing the acid radicals of soya bean oil can be prepared directly from the fatty acids of the oil by heating the acids with a polyhydric alcohol and a polycarboxylic acid under suitable conditions. Soya bean oil itself cannot be used directly and methods for its incorporation include using the oil along with an influential proportion of soya bean oil acids (or other fatty acid), rosin (or other acidic natural resin) or a phenol-aldehyde resin; or heating the oil in a preliminary step with a polyhydric alcohol, a reactive polybasic acid or a fusible phenol-aldehyde resin so as to render the oil miscible and reactive with the resin nucleus resulting from the esterification of the polyhydric alcohol and polybasic acid.

The various ways of utilizing soya bean oil in making resins of the oxidizing alkyd class are illustrated by the examples which follow. Soya bean oil is readily available but if required other semi-drying oils may be substituted therefor.

*Example 1*

|  | Parts |
|---|---|
| Glycerol | 94 |
| Phthalic anhydride | 160 |
| Soya bean oil (containing 3% free fatty acids) | 80 |

Heating was carried out in a flask fitted with an air condenser and mechanical stirrer for one hour and fifteen minutes, raising the temperature gradually. At the end of one hour and ten minutes a considerable frothing took place accompanied by thickening of the mixture and when temperature reached the point of 235° C. the whole contents of the flask gelatinized to a solid spongy infusible body containing free oil.

*Example 2*

|  | Parts |
|---|---|
| Glycerol | 94 |
| Phthalic anhydride | 160 |
| Soya bean oil fatty acids | 80 |

The mixture was heated in a round bottom glass flask provided with a reflux condenser and mechanical agitation for one and one-half hours up to 265° C. The product obtained was a dark, glossy, brittle, very slightly tacky resin. This resin has a melting point of 71° C. and a low acid number, namely, 17.2. The resin was easily soluble in the usual organic solvents and was blendable with nitrocellulose.

*Example 3*

|  | Parts |
|---|---|
| Glycerol (1 mole) | 92 |
| Phthalic anhydride (1¼ moles) | 185 |
| Soya bean fatty acids (½ mole) | 140 |

The glycerol and 120 parts of phthalic anhydride were heated to 200° C. after which the soya bean fatty acids and the remainder of the phthalic anhydride were added. Heating at 200–210° C. was continued until a homogeneous, rather soft mass was formed. This resin was readily soluble in benzene, acetone, butyl acetate and partially soluble in mineral spirits.

Mixtures of oils and fatty acids instead of the fatty acids alone also produce a satisfactory resinous mass for some purposes but greater care must be exercised in the preparation of such resins. In general, the resins are more susceptible to gelatinization at the elevated temperatures required in their production. The greater the proportion of fatty acids to oil used in their production, the less susceptible are such compositions to gelatinization and this point is clearly brought out in the following illustrations.

*Example 4*

|  | Parts |
|---|---|
| Glycerol | 94 |
| Phthalic anhydride | 160 |
| Rancid soya bean oil (containing 13% fatty acids) | 80 |

The above mixture was heated with agitation in a flask supplied with an air condenser for one hour and twenty minutes. The mixture did not polymerize at 235° C. but gradually became thicker on heating above this point and polymerization occurred at 246° C.

Example 5

| | Parts |
|---|---|
| Glycerol | 94 |
| Phthalic anhydride | 160 |
| Soya bean oil (containing 13% fatty acids) | 60 |
| Soya bean fatty acids | 10 |

These materials were placed in the same apparatus as above and gradually heated with agitation on an oil bath for two hours and forty-five minutes, bringing the temperature as high as 275° C. without any indication of gelatinization. The product of this reaction was a clear dark resin resembling that prepared with fatty acids alone (Example 2). The melting point of this resin was 89° C. and its acid number was 16.5.

Comparing the results obtained in Examples 1, 4 and 5, the relation between the relative amount of fatty acids and the temperature of gelatinization was as follows:

| | Example 1 | Example 4 | Example 5 |
|---|---|---|---|
| Per cent of fatty acids in total weight of oil and fatty acids | 3 | 13 | 26 |
| Temperature of gelatinization ° C | 235 | 246 | Above 275 |

Example 6

| | Parts |
|---|---|
| Glycerol | 50 |
| Phthalic anhydride | 100 |
| Soya bean oil | 57 |
| Soya bean fatty acids | 57 |

When the above mixture was heated at 230–240° C., it became homogeneous after ¾ hour. The product was a clear, soft resinous mass.

Example 7

| | Parts |
|---|---|
| Glycerol | 142 |
| Phthalic anhydride | 230 |
| Soya bean oil | 114 |
| Rosin | 200 |

Heated to 285–290° C. and held at this temperature for 1 hour. The product was a homogeneous, tough, resinous mass of reddish brown color.

Example 8

| | Parts |
|---|---|
| Glycerol | 92 |
| Phthalic anhydride | 180 |
| Soya bean oil | 140 |

The oil and glycerol were heated at about 240° C. for 6 hours with mechanical stirring. Heating for a long period is preferable. The phthalic anhydride was added to the resulting oil-glycerol product and the mixture was heated for 3 hours at 200–230° C. The solution became homogeneous shortly after the anhydride was introduced but the final product when cold was turbid.

Heating a glyceride oil with glycerol results in sensitization of the oil by alcoholysis, and formation of a mixture containing mono- and di-glycerides. Soya bean oil, as shown by the above example, is very resistant to alcoholysis in comparison with oils like linseed which, when heated with glycerol under the same conditions as soya bean oil, result in a final homogeneous mass and requires less heating of the oil-glycerol mixture.

The use of alcoholysis catalysts accelerates the reaction between glycerol (or other polyhydric alcohol) and soya bean oil. Alcoholysis catalysts are generally of an alkaline nature and include organic and inorganic bases, and salts of strong bases and weak acids such as sodium oxalate. Although alkaline catalysts are preferable, weak acids themselves sometimes function as alcoholysis catalysts; also mixtures of weak acids and alkaline-reacting salts.

Example 9

| | Parts |
|---|---|
| Glycerol | 92 |
| Phthalic anhydride | 100 |
| Soya bean oil | 70 |
| Lime | 3 |

The glycerol, oil and lime were heated at 250° C. for ½ hour during which time the mixture became homogeneous. The phthalic anhydride was then added and heating was continued for 1 hour at 250° C. A homogeneous tough resin of light reddish-brown color was formed.

Example 10

| | Parts |
|---|---|
| Glycerol | 92 |
| Phthalic anhydride | 220 |
| Soya bean oil | 140 |
| Sodium hydroxide | ¾ |

The glycerol, oil and sodium hydroxide were heated at 230° C. for ½ hour. The phthalic anhydride was introduced and the mixture heated for 1½ hours at 230° C. The clear brown resin was allowed to cool. A 33% solution in mineral spirits, to which 1% of mixed lead-cobalt naphthenate was added, formed a varnish which dried overnight to a hard, tough film.

Example 11

| | Parts |
|---|---|
| Glycerol | 92 |
| Phthalic anhydride | 200 |
| Soya bean oil | 100 |
| Sodium oxalate | 2½ |

The glycerol, oil and oxalate, when heated for ½ hour at 230° C., formed a clear, sensitized oil mixture which resulted in a homogeneous tough resin on adding the phthalic anhydride and heating for 1 hour at 230° C.

The rate of drying of soya bean oil resins can be accelerated by replacing part of the soya bean oil with a drying oil such as tung oil. The mixture of semi-drying and drying oil may be incorporated by means of a blending agent or sensitized as shown above. Alternately, soya bean oil may be mixed with an appropriate amount of drying oil acids, or soya bean fatty acids may be incorporated along with a drying oil.

Example 12

| | Parts |
|---|---|
| Glycerol | 92 |
| Phthalic anhydride | 220 |
| Soya bean oil | 100 |
| Tung oil | 50 |
| Sodium hydroxide | 1 |

The oils were alcoholized with the glycerol by heating in the presence of sodium hydroxide for ½ hour at 230° C. The phthalic anhydride was then added and the mixture heated at about 230° C. for 1½ hours to form a clear, tough, soluble resin.

Example 13

| | Parts |
|---|---|
| Glycerol | 92 |
| Phthalic anhydride | 220 |
| Soya bean oil | 125 |
| Tung oil | 25 |
| Sodium hydroxide | 1 |

Heated oils, glycerol and sodium hydroxide at 220–230° C. for ½ hour until a homogeneous liquid resulted. Added phthalic anhydride and heated at 230° C. for 1½ hours until a clear soft resin formed.

Example 14

| | Parts |
|---|---|
| Glycerol | 92 |
| Phthalic anhydride | 200 |
| Oxalic acid | 20 |
| Soya bean oil | 140 |
| Sodium hydroxide | ¾ |

Heated oil, glycerol and sodium hydroxide at 200–220° C. for ½ hour and added phthalic anhydride and oxalic acid. Heated for 2 hours longer and allowed the product to cool. The resin was much lighter in color than the resin of Example 13 which was made without use of oxalic acid. To 100 parts of a 33% solution of the resin in toluol, 2 parts of a 40% solution of lead-cobalt naphthenate was added. A film of the varnish dried overnight to a light-colored, tough coating.

Example 15

| | Parts |
|---|---|
| Glycerol | 92 |
| Maleic acid | 45 |
| Phthalic anhydride | 200 |
| Soya bean oil | 150 |
| Sulphuric acid dissolved in 4½ parts water | 1½ |

The oil and the sulphuric acid solution were heated slowly to 160° C. and the maleic acid was added gradually at this temperature, the rate of addition being such that excessive foaming was avoided. After all the maleic had been introduced the temperature was raised to 260° C. and a small amount of brown solid material in suspension was strained off leaving a clear, light-brown oil. The glycerol and phthalic anhydride were next added and the reaction mixture was heated for ½ hour at 200–210° C. A homogeneous soft resin resulted. This method of sensitization of the oil by maleic acid results in a resin of unusually light color. Maleic acid also results in color lightening when used with soya bean fatty acids.

Example 16

| | Parts |
|---|---|
| Glycerol | 92 |
| Phthalic anhydride | 130 |
| Maleic acid | 15 |
| Soya bean fatty acids | 280 |

The above mixture was heated at 200° C. for 2 hours. A very viscous liquid product resulted which was considerably lighter in color than a corresponding composition made without maleic acid. When an inert gas is present during the preparation of the resin the color is still lighter.

Example 17

| | Parts |
|---|---|
| Glycerol | 92 |
| Phthalic anhydride | 170 |
| Liquid soya bean fatty acids prepared as above | 170 |

This mixture was heated at 200–210° C. for 1½ hours and gave a brown, clear resin.

Example 18

The same proportions and procedure were used as in Example 17 but the solid fraction of soya bean fatty acids was substituted for the liquid fraction. The resin was more viscous than that of Example 17 and lighter in color.

Solutions of the resins of Examples 17 and 18 were prepared adding to each the same amount of drier. After 24 hours a film of the resin of Example 17 (liquid acids) was still tacky while a film from Example 18 (solid acids) was hard and without tackiness.

The use of blown oils in the preparation of the resinous products produced by means of the present invention is not precluded, and in some cases their use is of advantage in that a superior product for some purposes is formed.

The product differs from those produced from the oils which have not been blown in that a homogeneous product is formed at lower temperatures which is soluble in butyl acetate-butanol mixtures and benzol-alcohol, and there is no indication of any free oil being present. That is, when the vegetable oils are heated with polyhydric alcohol, such as glycerin, and polybasic acid, such as phthalic anhydride, gelatinization takes place at 240–250° C., when there are no free fatty acids present, and if the product is prepared at a temperature below this, namely, 235–240° C., a non-homogeneous resin is produced containing free oil, and unsuitable for use in many instances. When blown oils are substituted for the vegetable oils in the preparation of these resinous compounds gelatinization also takes place at 240–250° C., but very little, if any, free oil separates.

If the blown oil resinous compound is prepared at a temperature below that at which the mass will gelatinize, or, 235–240° C., a homogeneous translucent resin is produced, which is soluble in the above named solvents. It also has the additional valuable property of being much tougher than the resins produced from the free fatty acids, and in this respect differs from them.

Instead of using either the semi-drying oil fatty acids or rosin alone to bring about the combination of the semi-drying oil with the phthalic glyceride nucleus, a mixture of rosin and fatty acid may be used.

Example 19

| | Parts |
|---|---|
| Glycerol | 142 |
| Phthalic anhydride | 215 |
| Soya bean oil | 114 |
| Soya bean fatty acids | 57 |
| Rosin | 100 |

The above mixture was heated at a temperature of 200–210° C. for 1½ hours and formed a soft, clear, amber-colored resinous mass, soluble in toluene, ethyl acetate and acetone.

On account of their lower content of acids of the drying oil type, soya bean oil resins harden at a slower rate than resins made from drying oils such as linseed, perilla, tung and oiticica. Another feature of this invention is the preparation of resins from soya bean oil which dry at a speed comparable to that of linseed oil resins.

It has been found that maleic acid forms resinous esters with polyhydric alcohols, which harden when exposed to or heated in the presence of oxygen, the rate of hardening being increased by mixing metallic driers of the type used in oil varnishes therewith. Resins containing the constituents of soya bean oil and maleic acid can therefore be readily hardened by exposure to air, the maleic component of the resin exercising an enhancement of oxidation so that the resin containing soya bean oil, polyhydric alcohol and maleic acid dries at a rate more nearly comparable to a resin from linseed oil, polyhydric alcohol and phthalic acid.

To recapitulate, this invention concerns a resinous complex comprising the reaction product of soya bean or other semi-drying oil and/or the free fatty acids thereof, a polyhydric alcohol such as glycerol, polyglycerols, glycols, polyglycols, pentaerythritol, mannitol and sorbitol, and a polybasic organic carboxylic acid such as phthalic, succinic, malic, citric, maleic, fumaric, tartaric, oxalic and mixtures thereof, with or without a natural resin of acid number above 100 such as rosin and Congo. When the semi-drying oil itself is one of the reactants in making the resinous condensation product, there is used therewith an oil-resinifying component, by which term are meant substances which facilitate or accelerate the combination of the oil into the resin molecule. The action of the oil-resinifying component in facilitating combination of the glyceride oil with the resin molecule may occur in a one-stage resinification reaction (all reactants heated together until the desired degree of resinification has been reached as determined, for example, by acid number), or in a multi-stage process. Natural acid resins and fatty acids derived from glyceride oils by hydrolysis, or mixtures of natural acidic resins and semi-drying oil fatty acids, are examples of oil-resinifying components which can be used in a one-stage reaction between the semi-drying oil, polycarboxylic acid and polyhydric alcohol. As mentioned previously, small amounts of alkalies or salts of alkalies and weak acids, such as soaps of semi-drying oil acids, are examples of oil-resinifying components utilizable in processes involving heating the glyceride oil with polyhydric alcohol prior to incorporation with the polybasic acid. Other oil-resinifying components applicable when the glyceride oil is heated in a preliminary step with a resinifying carboxylic acid include boric acid, sulphonic acids or small amounts of sulphuric and phosphoric acid.

What I claim is:

1. The method of producing condensation products which comprises reacting together a polycarboxylic acid, a polyhydric alcohol, and soya bean oil, and soya bean acids in an amount above 13% based on the weight of the oil and fatty acids present raising the gelatinization point above 246° C., thereby producing substantial combination of the oil in the resin molecule prior to gelatinization of the resin.

2. A resinous condensation product of a polycarboxylic acid, a polyhydric alcohol, soya bean oil, and glyceride oil acids, the amount of oil acids being more than 13% based on the weight of the oil and oil acids, whereby a product is obtained gelatinizing above 246° C. containing substantial combination of the oil in the resin molecule prior to gelatinization.

3. A resinous condensation product of a polycarboxylic acid, a polyhydric alcohol, and soya bean oil, and soya bean acids in an amount greater than 13% based on the weight of oil and acids, producing a product gelatinizing above 246° C. and containing substantial combination of the oil in the resin molecule prior to gelatinization.

4. A resinous condensation product of a polycarboxylic acid, a polyhydric alcohol, soya bean oil, and glyceride oil acids, the oil acids being present in an amount which gives a product having a gelatinization point above 275° C. and substantial combination of the oil in the resin molecule prior to gelatinization of the resin.

5. A resinous condensation product of a polycarboxylic acid, a polyhydric alcohol, soya bean oil, and soya bean acids in an amount of 26% based on the weight of oil and acids present, giving a product having a gelatinization point above 275° C. and substantial combination of the oil in the resin molecule prior to gelatinization of the resin.

CARLETON ELLIS.